United States Patent [19]

Bach et al.

[11] Patent Number: 4,753,487
[45] Date of Patent: Jun. 28, 1988

[54] FAILURE SWITCH FOR BRAKING SYSTEM PROPORTIONING VALVE

[75] Inventors: Lloyd G. Bach, South Bend, Ind.; Robert F. Gaiser, Stevensville, Mich.

[73] Assignee: Allied Corporation, Morristown, N.J.

[21] Appl. No.: 935,872

[22] Filed: Nov. 28, 1986

[51] Int. Cl.⁴ .................... B60T 8/26; B60T 11/34
[52] U.S. Cl. .................... 303/9.63; 60/535; 200/82 D; 303/9.72; 303/84.2; 340/52 C; 188/151 A; 188/349
[58] Field of Search .......... 303/6 C, 6 R, 84 A, 303/84 R, 6 A, DIG. 3; 188/151 A, 349, 345; 200/82 D; 340/52 C; 60/535, 591, 582, 581, 545

[56] References Cited

U.S. PATENT DOCUMENTS

| 3,450,443 | 6/1969 | Bueler | 303/6 C |
|---|---|---|---|
| 3,729,237 | 4/1973 | Ishikawa et al. | 303/84 A |
| 3,760,841 | 9/1973 | Daffron | 303/6 C X |
| 3,825,303 | 7/1974 | Yabuta | 303/6 C |
| 3,917,355 | 11/1975 | Takeuchi | 303/84 A X |
| 3,975,060 | 8/1976 | Hirayama | 303/84 A X |
| 3,977,731 | 8/1976 | Kasahara | 303/84 A X |
| 4,004,839 | 1/1977 | Burgdorf | 303/84 A X |
| 4,281,880 | 8/1981 | Gaiser et al. | 303/84 A X |
| 4,284,308 | 8/1981 | Hayashida | 303/6 C |
| 4,299,426 | 11/1981 | Hales et al. | 303/6 C |
| 4,350,395 | 9/1982 | Lüpertz | 188/349 X |
| 4,365,844 | 12/1982 | Carré et al. | 303/6 C |
| 4,392,691 | 7/1983 | Schopper et al. | 188/349 X |
| 4,401,347 | 8/1983 | Kawaguchi et al. | 188/349 X |
| 4,500,138 | 2/1985 | Mizusawa et al. | 303/6 C |
| 4,637,662 | 1/1987 | Brown | 303/6 R |

Primary Examiner—Douglas C. Butler
Attorney, Agent, or Firm—Ken C. Decker

[57] ABSTRACT

The invention is a hydraulic failure compensating switch which incorporates a differential pressure valve which responds to a hydraulic failure in one of a pair of vehicle braking circuits and altering the pressure reducing function of the braking system proportioning valve(s) in response thereto to increase braking torque at the vehicle's rear wheels.

8 Claims, 1 Drawing Sheet

# FAILURE SWITCH FOR BRAKING SYSTEM PROPORTIONING VALVE

BACKGROUND OF THE INVENTION

The present invention relates to devices for improving failure mode performance of a braking system and in particular to a switch responsive to a braking system failure for disabling the system's proportioning valve or valves to thereby increase braking effectiveness of non-failed portions of the system.

Proportioning valves are now an established and well known component of braking systems for motor vehicles. These valves function to proportion the pressure of braking fluid from a source such as a master cylinder or booster between the front and rear wheels of the vehicle. Reducing the pressure to the rear wheels with respect to the front wheels reduces the tendency of the rear wheels to lock. Such valves may function with a fixed proportioning ratio or may, in more sophisticated variations, include height, inertia or load sensing means to further vary or proportion the application of pressurized fluid based upon loading of the vehicle. Such devices provide significant improvements in operation of the braking system under normal operating conditions. However, in the event of a failure in one of the circuits of a braking system, and in particular such a failure affecting one or both of the front wheels of the vehicle, emergency braking of the vehicle must be accomplished through the vehicle's operational hydraulic circuit. Under these half system conditions, the proportioning valve can reduce the effectiveness of the braking system by reducing the available fluid pressure at the vehicle's rear wheels.

Accordingly, there exists a need to provide a device which will respond to a braking system failure affecting the front wheels of a vehicle to disable or otherwise modify operation of the proportioning valve to increase the available braking pressure at the vehicle's rear wheels.

In its broader aspects, the invention is a failure compensating switch for use in a vehicle braking system which includes a plurality of braking circuits and at least one brake pressure proportioning valve for reducing the pressure of braking fluid applied to the rearwardly disposed wheels of the vehicle in proportion to a predetermined parameter such as braking pressure or vehicle wheel loading. The failure compensating switch comprises a differential pressure valve means connected between the braking circuits for operation between at least a first and a second operating condition in response to a pressure failure in one of the braking circuits. A disabling means is connected to the differential pressure valve means and to the vehicle's source of pressurized braking fluid for operation in response to operation of the differential pressure valve means to render the proportioning valve partially or fully inoperative.

In a specific embodiment of the invention, for use in a braking system of the cross-split variety, the differential pressure valve is interposed between the right front-left rear and the left front-right rear braking circuits. The differential pressure switch is normally in a neutral position and is bidirectionally operable in response to a braking system failure in one of the two braking circuits. The disabling means includes a piston device isolated from the braking system when the differential pressure valve is in its neutral position. The disabling means is fluidly connected to a source of braking fluid in response to operation of the differential pressure valve, and exerts a force against the proportioning valve to render same inoperative under these conditions.

It is therefore an object of the invention to provide a device for rendering a proportioning valve of a braking system at least partially inoperative in response to a braking system failure.

It is another object of the invention to provide such a device which includes a differential pressure switch for sensing a failure in one of the braking circuits of a motor vehicle and rendering a proportioning valve associated with a nonfailed circuit inoperative in response thereto.

Still another object of the invention is to provide such a device which includes a fluid-operated piston assembly which generates a force against the vehicle's proportioning valve in response to a failure of the braking system affecting the front wheel brakes of the vehicle to render the proportioning valve inoperative.

Another object of the invention is to provide such a device which will automatically return to an inoperative state wherein it has no effect on the vehicle's normal braking system when a braking system failure is corrected.

Yet another object of the invention is to provide such a device which is useable on a variety of braking systems including cross-split braking systems and systems incorporating anti-lock control devices.

BRIEF DESCRIPTION OF THE DRAWINGS

These and other objects or purposes of the invention and the invention itself will be best understood in view of the following detailed description of the invention taken in conjunction with the appended drawings wherein.

DESCRIPTION OF THE PREFERRED EMBODIMENTS

Figure 1:
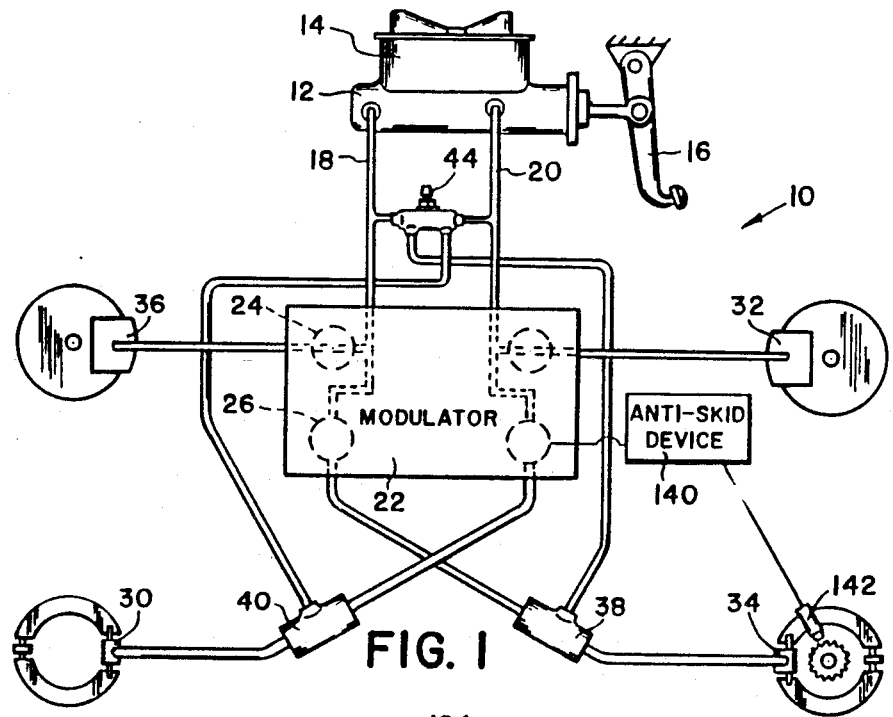
FIG. 1 is a schematic diagram of a typical cross-split braking system incorporating a device in accordance with the invention.

Referring now to the drawings, there is shown in FIG. 1 a braking system 10 of a typical motor vehicle such as an automobile. The system includes a master cylinder 12 with associated fluid reservoir 14 and pedal actuator 16. The master cylinder is of the dual circuit variety having two hydraulic outputs feeding circuits 18 and 20. The master cylinder may further be hydraulically or vacuum boosted and may, for purposes of the invention, comprise any form pressurized braking fluid source having at least two outputs.

The circuits 18, 20 are connected in conventional fashion to associated pairs of the brake wheel cylinders connected to pairs of wheels of the vehicle. The connection may be made to provide a front-rear split braking system, cross-split braking system, or the like, as desired. The braking system may further be provided with an anti-lock system such as is shown in FIG. 1. As illustrated, a braking pressure modulator 22 is provided, modulator including a plurality of modulating valves such as shown diagramatically by dashed boxes 24, 26. Modulating valves may comprise single or multiple function valves, as now well known in the art. The modulating valves provide for direct connection of the vehicle's brakes to the master cylinder 12 under normal braking conditions and provide automatic modulation of braking pressure upon sensing an imminent skid condition. Such systems are disclosed, for example, in U.S. Pat. No. 4,637,662 to Brown, and in co-pending U.S. patent application 789,203, filed Oct. 18, 1985, and commonly assigned with the present invention. In the alternative, the two braking circuits can be connected directly to associated pairs of wheels, that is, with no anti-lock braking system. In the illustrated embodiment, the system is shown in a cross-split configuration in which the left front brake 36 and right rear brake 34 comprise one braking circuit while the right front brake 32 and left rear brake 30 comprise the other braking circuit. In each of the circuits there is provided a proportioning valve 38, 40, respectively. The proportioning valves 38, 40, in well known manner, operate to reduce or proportion the pressure of hydraulic fluid applied to the rear wheels of a vehicle.

Figure 3:
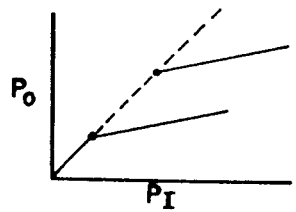

A typical output curve for a proportioning valve is shown in FIG. 3. The output pressure from the proportioning valves 38, 40 is indicated as Po and the input pressure to the valve is indicated as Pi. These valves may be of the type that provide a fixed proportioned output as shown in solid lines or may have a variably proportioned output wherein the valve responds to means for sensing the height or load on the rear wheels to vary the output pressure curve as shown in dashed lines.

Under normal braking conditions, full braking pressure will be applied to the brakes of the front wheels of the vehicle and a proportionally reduced braking pressure will be applied to the rear brakes of the vehicle. This braking pressure will be proportioned, within practical limits, to the rear wheels of the vehicle to effect maximum braking thereof.

Figure 2:
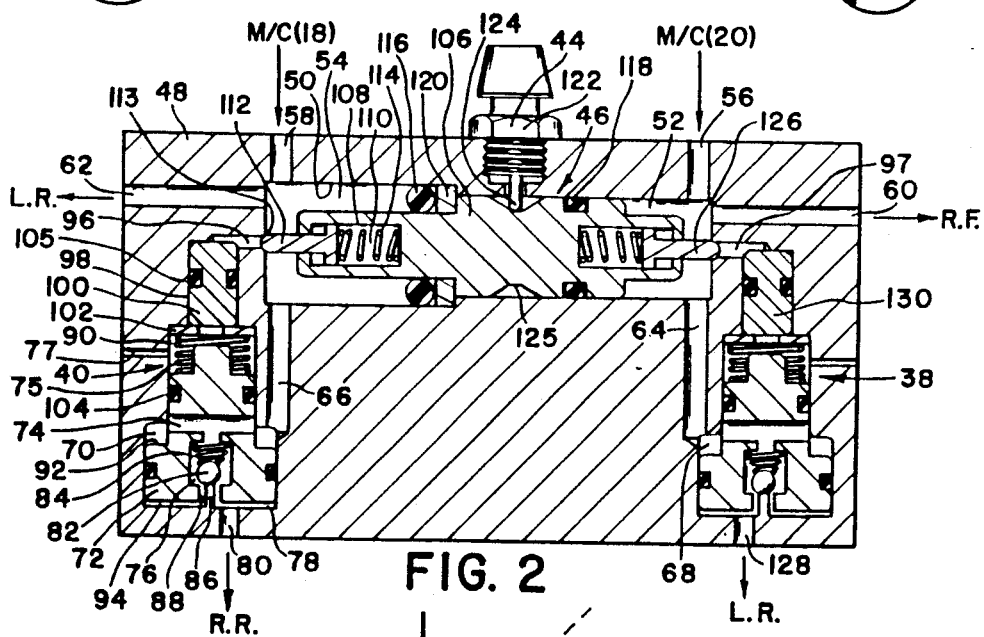
FIG. 2 is a cross-sectional illustration of the failure compensating switch of the present invention; and, FIG. 3 is a graph showing the pressure response of a typical proportioning valve and the modification thereof in response to operation of the present invention.

In the event that there should occur a failure in one of the hydraulic circuits 18, 20 of the vehicle, it will be seen that the braking force available to the vehicle will be significantly reduced. This reduced available braking deceleration permits additional rear brake torque since less weight transfer from the rear of the vehicle will occur for a specific front brake pressure. To reduce the effect of the failure of one brake circuit on vehicle stopping capability, the present invention provides a switch device as illustrated in FIG. 2 that increases available rear brake pressure with half system malfunctions.

The switch device 44 includes a differential pressure switch assembly 46 and two identical proportioning valve assemblies 38, 40 disposed in the illustrated embodiment in a single valve switch body 48. Body 48 is provided with a transversely extending stepped diameter bore 50. The ends 52, 54 of the bore 50 are provided with inlet ports 56, 58, respectively which communicate with the two output circuits 18, 20 of the master cylinder 12. Outlet ports 60, 62 also communicate with the bore ends 52, 54 and pass pressurized braking fluid directly to the right front and left front brakes.

Fluid passages 64, 66 also communicate with bore ends 52, 54 to pass pressurized braking fluid to proportioning valve chambers 68, 70.

Proportioning valve 40 includes a stepped diameter valve element 72 slidably received in the stepped diameter bore or chamber 70. The valve element 72 is provided with transverse fluid passage 74, an axially extending fluid passage 76 communicating with the end 78 of chamber 70, and a fluid outlet passage 80 connected to the right rear wheel of the vehicle.

Passage 76 is enlarged in its central portion and a ball valve element 82 is received therein, ball valve element 82 being resiliently urged downwardly (as viewed in the drawings) by a spring 84. A small cylindrical element 86 extends upwardly through reduced diameter portion 88 of the fluid passage 76 to define therewith a fluid metering passage which communicates pressurized fluid from the passage 66 through the valve element 72 to the outlet passage 80. Valve element 72 is maintained in a normal position adjacent end 78 of chamber 70 by a spring 90 which establishes the normal function break point or knee. In normal operation, pressurized fluid entering the chamber 70 acts against surface 92 of the valve element 72 and simultaneously against the surface 94 thereof. The differential areas of the piston coupled with the action of the spring 0 produces the pressure "in" versus pressure "out" relationship shown in FIG. 3. The proportioning valve as illustrated is of the fixed proportioning variety but may also comprise a proportioning valve in which proportioning is varied in response to a parameter such as the height of the vehicle.

An additional fluid passage 96 communicates with the end 54 of chamber 50 and a piston chamber 98, the former communicating with proportioning valve chamber 70 via passage 66. A cylindrical piston 100 is slidably received in the chamber 98 and is maintained in its upward (as viewed in the drawings) position by the spring 90 and an annular ring 102. A plurality of "0" ring seals as at 104, 105 are provided to effect a fluid tight seal between the valve elements 72 and the piston 100. The central portion 75 of the chamber 70 is vented by means of vent psssage 77.

The differential pressure valve includes reciprocating piston 106 slidably received in chamber 50. End 108 of the piston 106 is provided with a cylindrical bore 110 in which is received a poppet valve element 112 extended into engagement with valve seat 13 by spring 114. Fluid tight sealing is effected between the piston 106 and chamber 50 by "0" rings 116, 118 and an annular ring 120. An electrical switch 122 has an actuating pin 124 received in recess 125 in piston 106 and is actuated by axial movement thereof. In a normal operating state wherein the pressure in both hydraulic circuits 18 and 20 is substantially equal, the differential pressure valve piston 106 will remain substantially centered as shown. Full master cylinder pressure will be applied to the left front and right front brakes through passages 60, 62 and reduced pressure fluid will be applied to the rear wheels through passages 80, 128. The valve elements 112, 126 close passages 96, 97.

The proportioning valve assembly 38 is identical to assembly 40 as is the poppet valve assembly 126 whereby reduced pressure braking fluid applied to the left rear wheel via fluid passage 128 is the same as that in passage 80.

In the event of a loss of pressure in either circuit 18 or 20, piston 106 will shuttle. For example, if pressure is lost in end 52, piston 106 will move to the right (as viewed in the drawings). Under these conditions, the valve assembly 126 maintains the fluid passage to piston 130 closed while valve 112 will move to the right to open the passage 96 and apply pressurized fluid from chamber end 54 to the piston 100. Since piston 100 is vented to atmosphere via passage 77, piston 100 moves downwardly in the chamber 98. This maintains the valve element 72 in its illustrated position wherein the fluid metering orifice 88 is fully open and full braking pressure is applied to the right rear wheel. Switch 122 will be operated to provide an indication of the pressure failure by means such as a warning light (not shown). In identical fashion, in the vent of a failure of pressure in the end 54, the piston 106 will slide to the left opening the valve assembly 126 and disabling the proportioning valve assembly 38. Due to the minimal travel of valve element 72, only a minimal loss of displacement will occur in the non-failed circuit.

With reference again to FIG. 1, it will be observed that in the event of a failure in braking circuit 18 or 20, the action of the failure switch in the present invention will disable the proportioning valve 38 or 40 associated with the other braking circuit whereby full braking pressure will be applied to the rear wheel thereof. Because of the reduced front wheel braking torque available, less weight transfer from rear to front of the vehicle occurs and increased rear braking torque is available. Directional control shall be maintained by the non-braked wheels of the vehicle. This improvement in braking can be even more significant if the wheels of one side of the vehicle are on a low coefficient surface.

The device has been described in conjunction with a conventional cross-split braking system. It will be observed that the device will work identically when used in conjunction with a braking system incorporating an anti-lock braking device such as 140 which senses wheel speed via sensors 142 and effects modulation of brake pressure via solenoid valves or the like as at 24, 26. It will also be observed that while the system has been described in conjunction with a cross-split braking system, the device can also be utilized with a front-rear split braking system. In such an application, a single proportioning valve will be utilized and accordingly only one of the valve assemblies 38 or 40 will be required, the system being otherwise identical. The system in this case will provide increased braking to a rear wheels in the event a failure of the front wheel braking circuit.

Although the present invention has been illustrated and described in connection with example embodiments, it will be understood that this is illustrative of the invention, and is by no means restrictive, thereof. It is reasonably to be expected that those skilled in the art can make numerous revisions and additions to the invention and its is intended that such revisions and additions will be included in the scope of the following claims as equivalents of the invention.

What I claim is:

1. A failure compensating switch for use in a vehicle braking system which includes a plurality of hydraulically isolated braking circuits and brake pressure proportioning valve means for reducing the pressure of braking fluid applied from a source of pressurized braking fluid to the wheel cylinders associated with the rearwardly disposed wheels of the vehicle in proportion to a predetermined parameter, the failure compensating switch comprising differential pressure valve means connected between said braking circuits for operation from a first to a second operating condition in response to a pressure failure in one of said hydraulic circuits, proportioning valve altering means connected to said differential pressure valve means and operatively engaging said proportioning valve means for operation in response to operation of said differential pressure valve means into said second condition for altering the pressure reducing function of said proportioning valve means to increase the pressure of braking fluid applied to said rearwardly disposed wheel cylinders associated with a nonfailed braking circuit, said proportioning valve means including at least one hydraulic valve connected between said source and at least one of said wheel cylinders, and being responsive to the pressures of braking fluid from said source and from said wheel cylinder to output pressurized braking fluid at a reduced pressure, said said altering means including a hydraulic piston operatively engaging said proportioning valve means hydraulic valve, and a normally closed valve operatively coupled to said differential pressure valve means for interrupting communication between said source and said hydraulic piston when said differential pressure valve means is in said first position and opening communication therebetween when said differential pressure valve means is in said second position.

2. The failure compensating switch of claim 1 wherein said piston abuttingly engages said proportioning valve means hydraulic valve, said proportioning valve means further including a variable orifice operative between open and closed states in response to movement of said hydraulic valve between said first and second positions to thereby reduce the pressure of braking fluid applied to said rear wheels, said hydraulic piston urging said hydraulic valve toward said first position and thereby, said orifice into said open position, in response to the application of pressurized fluid from said source to said hydraulic piston.

3. The failure compensating switch of claim 2 wherein said braking system includes two said hydraulic circuits, said differential pressure valve means being operable to said first position in response to substantially equal pressure in both said circuits, to said second position in response to a hydraulic failure in one of said circuits, and to a third position in response to a hydraulic failure in the other of said circuits.

4. The failure compensating switch of claim 3 wherein there are two of said altering means valves, opposite ones of said valves being operable in response to movement of said differential pressure valve means to said second and third positions, respectively.

5. The failure compensating switch of claim 4 wherein said differential pressure valve means includes a normally centered differential pressure piston movable between opposite ends of a valve chamber, said altering means valves being poppet valves connected to opposite ends of said differential pressure piston.

6. The failure compensating switch of claim 5 further including fluid passages communicating between opposite ends of said chamber and respective ones of said altering means pistons, there being valve seats at those ends of said fluid passages communicating with said chamber ends.

7. The failure compensating switch of claim 6 wherein said poppet valves are slidably received in recesses formed in the opposite ends of said differential pressure piston, and further including spring means axially resiliently maintaining said poppet valves in positions closing said fluid passages when said differential pressure piston is in said first position.

8. The failure compensating switch of claim 3 wherein said hydraulic circuits are connected in a cross-split configuration, there being a said proportioning valve means associated with each said circuit.

* * * * *